United States Patent [19]
Barca

[11] Patent Number: 5,386,894
[45] Date of Patent: Feb. 7, 1995

[54] VIBRATION DAMPING DEVICE

[76] Inventor: Didier Barca, 43, quai Aristide Briand, 78510 Triel-sur-Seine, France

[21] Appl. No.: 727,484

[22] Filed: Jul. 9, 1991

[30] Foreign Application Priority Data

Jul. 12, 1990 [FR] France ............... 90 08887

[51] Int. Cl.⁶ ............... F16F 7/10; B60B 17/00
[52] U.S. Cl. ............... 188/379; 74/574; 301/6.91; 295/7
[58] Field of Search ............... 188/73.37, 73.36, 379, 188/380; 267/136, 137, 141, 141.1, 294; 74/574, 443; 301/6.91, 6.1, 37.32, 37.42; 295/6, 7; 181/207, 208, 296

[56] References Cited

U.S. PATENT DOCUMENTS

| | | | |
|---|---|---|---|
| 2,605,132 | 7/1952 | Watter | 295/7 |
| 3,080,771 | 3/1963 | Baldwin | 74/574 |
| 3,084,009 | 4/1963 | Heym | 188/380 X |
| 3,486,593 | 12/1969 | Afanador | 188/73.37 X |
| 3,918,555 | 11/1975 | Rath | 188/73.37 |
| 4,183,572 | 1/1980 | Albrecht et al. | 181/207 X |
| 4,278,726 | 7/1981 | Wieme | 267/141.1 X |
| 4,353,586 | 10/1982 | Raquet et al. | 295/7 |
| 4,378,865 | 4/1983 | McLean | 188/379 |
| 4,603,760 | 8/1986 | Myers | 188/73.37 |
| 4,719,892 | 1/1988 | Crevillen | 267/136 X |
| 4,865,163 | 9/1989 | Kondo | 188/73.37 |
| 4,924,976 | 5/1990 | Bernett | 267/141 X |
| 4,968,010 | 11/1990 | Odobasic | 267/294 X |
| 5,056,763 | 10/1991 | Hamada et al. | 188/379 X |

FOREIGN PATENT DOCUMENTS

| | | | |
|---|---|---|---|
| 50567 | 4/1982 | European Pat. Off. | 295/7 |
| 2745737 | 4/1979 | Germany | 188/379 |
| 116202 | 7/1983 | Japan | 295/7 |
| 29828 | 2/1984 | Japan | 188/73.37 |
| 47536 | 3/1984 | Japan | 188/73.37 |
| 17439 | 1/1987 | Japan | 267/141.1 |
| 176227 | 2/1990 | Japan | 267/136 |
| 445124 | 4/1936 | United Kingdom | 295/7 |

OTHER PUBLICATIONS

*New Materials for Vibration Damping Control* by F. Kirschner, Inter-Noise 75, pp. 499–506, Aug. 1975.

Primary Examiner—Robert J. Oberleitner
Assistant Examiner—Kevin D. Rutherford
Attorney, Agent, or Firm—Felfe & Lynch

[57] ABSTRACT

In a vibration-damping device, viscoelastic material which dissipates vibration energy is bonded to a supporting member so as to form a removable unitary assembly which can be coupled to the vibration emitter, the viscoelastic material being clamped between the supporting member and a stressing element.

8 Claims, 3 Drawing Sheets

VIBRATION DAMPING DEVICE

BACKGROUND OF THE INVENTION

1. Field of the Invention

The present invention relates to a device for damping vibrations at resonance of an emitter by making use of viscoelastic material having the function of dissipating the vibration energy by means of a member which provides a coupling with the emitter.

2. Description of the Prior Art

In the prior art, it was a known practice to damp vibrations of this type by carrying out a treatment which consisted in applying a damping material having viscoelastic properties in free layers which were consequently unstressed. This type of treatment, however, has often proved ineffective.

A device which has been proposed in order to solve this problem makes use of viscoelastic material and is capable of associating this material with the vibration emitter by means of a coupling member which consists of a stressing back-plate having the same nature as the emitter. The back-plate is held in position either by adhesive bonding or by means of an added fastening element such as a screw, ring or the like according to the nature and configuration of the support to be treated.

By way of example, vibration-damping devices of this type find applications in the treatment of train wheels, circular-saw blades, rotating machines, gears, and so on.

In a known device of this type, vibration damping accordingly takes place by shearing of the fibers of viscoelastic material with respect to each other. The viscoelastic material is inserted between the vibration-emitting support and the stressing back-plate which is coupled thereto by any known fastening means. The degree of coupling between the three layers of the composite structure thus formed governs their capacity for responding to the vibration as a separate entity.

In consequence, a certain degree of control of coupling is necessary in order to obtain optimum contact of the viscoelastic material against the emitter, irrespective of the conditions of use.

Coupling control is difficult to achieve and cannot be reliable in known damping devices since they are usually put into operation by hand.

Furthermore, positioning of the different constituent elements of the device is not an easy matter since it is performed in successive steps.

The object of the present invention is to overcome these disadvantages by dispensing with the multiplicity of steps involved in the practical application of the device and with the need to control clamping during the coupling operation.

SUMMARY OF THE INVENTION

The invention is accordingly concerned with a device for damping vibrations at resonance of an emitter by making use of viscoelastic material having the function of dissipating the vibration energy via means which provide a coupling with the emitter. The vibration damping device is distinguished by the fact that the viscoelastic material is placed beforehand on a supporting member and bonded thereto so as to form a removable unitary assembly which can be coupled to the emitter by inherent means.

The solution proposed offers a considerable number of advantages which are essentially procured by the removable character of the device which constitutes an indissociable unitary assembly.

This accordingly avoids any operation which consists in maintaining the material on the emitter by adhesive bonding prior to mechanical coupling thereto and which entails the need to carry out degreasing and surface preparation of the emitter.

The solution proposed also avoids any operation involving preparation and cutting of a sheet of viscoelastic material which is to be placed before-hand on the emitter, which is sometimes of complex shape and which has open portions located in the web of a wheel, for example.

In the case of bonding of parts by means of a thermal process, the parts are heated to a temperature which can attain or even exceed 250° C. However, the majority of viscoelastic materials available on the market do not withstand a temperature of this order. In accordance with the invention, such a situation no longer presents any problem since the damping device can be mounted at a subsequent stage.

Moreover, it is very often impossible to carry out a conventional annular antivibration treatment during or after assembly of all or part of a gear train.

In order to overcome this difficulty and in accordance with another distinctive feature of the invention, the supporting member is formed by an elastically deformable open ring which is capable of fitting under permanent radial stress within a corresponding annular retaining groove of the emitter by resilient snap-action engagement by expansion or by compression and constitutes the coupling means. As used herein, the term "open ring" means a ring having a gap which permits radial compression. Holes may be provided adjacent the gap to facilitate compression with needle-nosed pliers.

This distinctive feature is of course also applicable to any other type of wheel. It is only necessary in such cases to carry out re-machining of the groove but provision can be made for this operation at the design stage. Furthermore, this degree of simplicity of application of the device enables the user to undertake the assembly operation without requiring any immobilization of additional stock. In addition, the user can readily carry out the maintenance and renewal of the antivibration treatment.

Moreover, the device is of small overall size and offers two undeniable advantages, namely a very limited weight contribution and consequently no problems of balancing while initial accessibility is maintained.

In accordance with another distinctive feature of the invention, the viscoelastic material is clamped in the form of a layer between the supporting member and an integrated elastically deformable stressing element in order to dissipate the vibration energy by shearing.

In the example of application of a wheel, the location of a device in accordance with the invention at the inner periphery is particularly conducive to good energy transfer between the part at resonance, the viscoelastic material and its elastic stress.

Under these optimum conditions, the cross-section of the device is reduced to a minimum.

The efficiency of the energy conversion process (viscous damping) is also optimized by the permanent application of radial stress to the supporting member and hence to the viscoelastic material.

In accordance with a further distinctive feature of the invention, the supporting member and the stressing element constitute with the viscoelastic material interposed between them a multilayer structure comprising at least three layers bonded to each other, if necessary by means of an adhesive. It may be necessary to provide a larger stack comprising a series of several successive pairs each formed by viscoelastic material and a stressing element. In some cases, the different layers can be connected to each other via the viscoelastic material itself when it consists, for example, of adhesive-bonded rubber or a suitable resin. In the event that an adhesive is employed, it is an advantage to choose a high-performance structural adhesive such as the cyanoacrylates.

In accordance with another distinctive feature of the invention, the stressing element is directed towards the vibration emitter at the time of assembly.

In accordance with yet another distinctive feature of the invention, the supporting member alone is in mechanical contact with the emitter.

As shown by tests which have been made, this arrangement offers excellent results and makes it possible to dispense with the need to control clamping during the operation involved in coupling the device to the vibration emitter.

In accordance with still another distinctive feature of the invention, the supporting member and the stressing element are formed from a sheet of carbon spring steel having resilient properties.

DESCRIPTION OF THE PREFERRED EMBODIMENTS

The invention relates to the application of a known principle which consists in damping vibrations at resonance by making use of viscoelastic material chosen for its physical characteristics which are suited to the conditions of use of parts under study, in particular for its optimum damping, within ranges of temperature and frequency which cover the conditions of use of parts to be equipped such as train wheels, gear wheels, circular saws, and so on.

Figure 3:
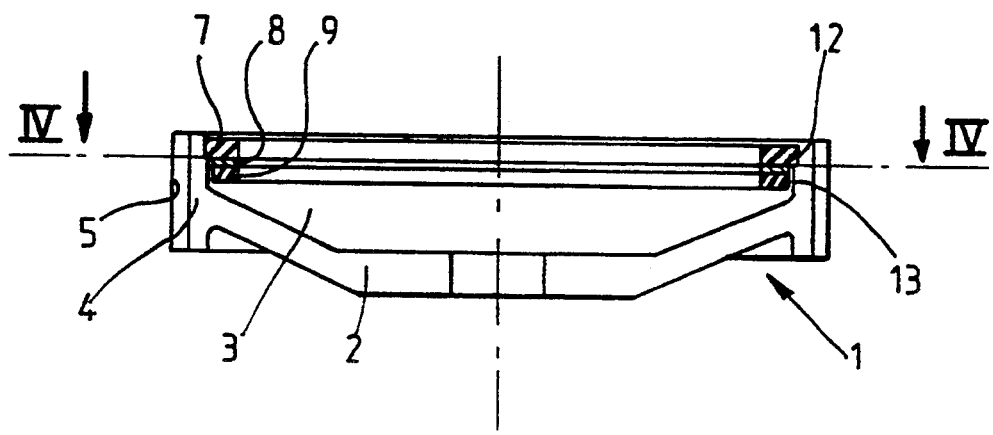
FIG. 3 is an axial sectional view of a damping device in accordance with FIG. 1 and placed in a vibration-emitting wheel.
Figure 4:
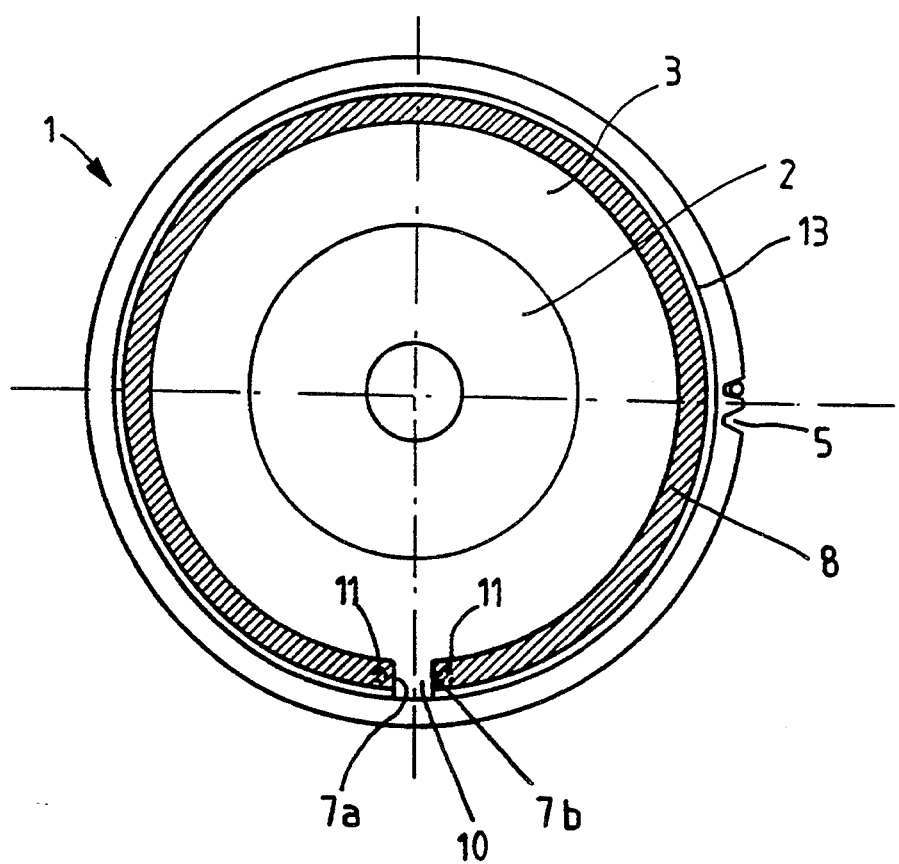
FIG. 4 is a sectional view of the device, taken along line IV—IV of FIG. 3.

By way of example of application, there is shown in FIGS. 3 and 4 a gear wheel 1 having a disk-like body 2 which forms a cavity 3, gear teeth 5 being cut at the periphery 4 of said body.

Figure 1:
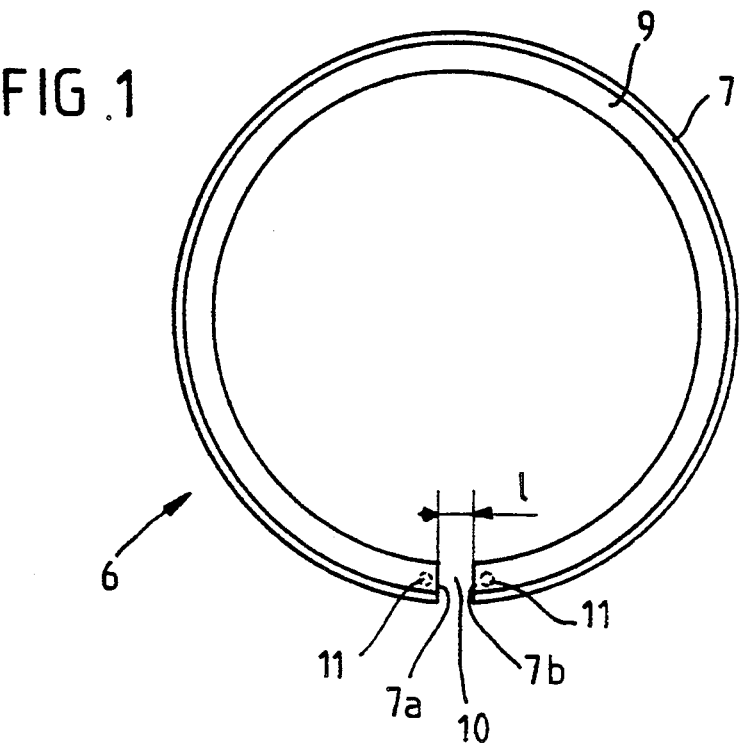
FIG. 1 is a plan view of the removable vibration-damping device in accordance with the invention.
Figure 2:
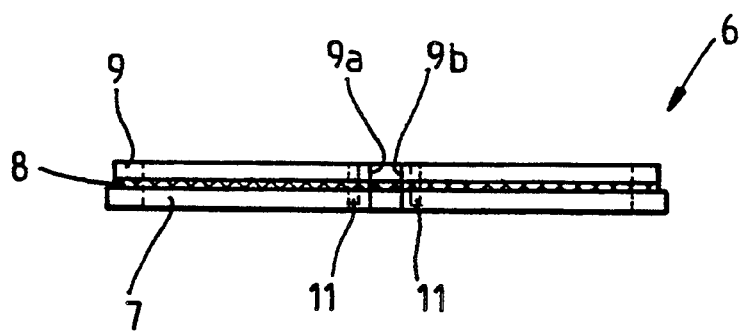
FIG. 2 is a side view of the device shown in FIG. 1.

Referring to FIGS. 1 and 2, a device 6 for damping vibrations at resonance includes a supporting member 7, viscoelastic material 8 in film or sheet form being placed on the supporting member and fastened thereto by adhesive bonding. The viscoelastic material 8 supports an integrated elastically deformable stressing element 9 in order to permit dissipation of vibration energy by shearing as soon as the part equipped with the device enters into resonance.

In order to ensure satisfactory efficiency of the energy conversion process, highly efficient bonding is necessary between the three layers thus formed, these layers being constituted respectively by the supporting member 7, the viscoelastic material 8 and the stressing element 9.

In accordance with the invention, the supporting member 7 also constitutes a coupling means of the device 6 which is then coupled as a whole to the wheel 1. To this end, the supporting member 7 is advantageously formed by a flat ring having a gap 10, the width "1" of which is such as to make the ring elastically deformable from a position of rest (FIG. 1) to a compressed position of assembly which causes the free ends 7a, 7b of said ring to correspond in register. Holes 11 are formed in proximity to these ends in order to permit compression of the ring at the time of assembly by means of needle-nosed pliers.

The supporting and coupling member 7 thus constructed has dimensions which enable it to fit under permanent radial stress within an annular retaining groove 12 of corresponding shape which is formed in an inner peripheral bore 13 of the wheel 1. In consequence, the diameter of the groove 12 will be smaller than that of the supporting and coupling member 7 so as to permit resilient snap-action engagement by expansion of the ring member after it has been subjected to compression in order to permit its introduction into the groove.

It should be noted that the invention is applicable not only to hollow parts having bores but also to shafts.

In fact, the diameters of the stressing element 9 and of the layer 8 of viscoelastic material have identical diameters which are smaller than that of the supporting and coupling member 7 so that the member 7 alone is in direct contact with the part to be treated, either by means of its outer periphery in the case of a hollow part or by means of its inner periphery in the case of a shaft. This is made possible by the use of segments having suitable radial diameters and heights which make it possible to adapt the device to both situations.

Although the quality of the bonds between each of the three layers of the device is studied with particular care and suited to the conditions of use, the preferential direction which is recommended for the mounting operation, namely in which the stressing element 9 is directed towards the wheel 1 in the example considered, makes it possible to guarantee that no part is liable to become detached from a treated part.

The rings constituting the supporting and coupling member 7 and the stressing element 9 are formed from special steel having a high hardness value.

Their respective thicknesses and cross-sections are strictly determined in order to provide a sufficient exchange surface area for damping vibrations, ensure perfect coupling with the treated parts irrespective of the level of vibrations, produce targeted optimum damping (in frequency and in temperature).

By way of example, the following characteristics relating to the construction of the supporting and coupling member 7 and of the stressing element 9 have produced particularly satisfactory results in a specific example of application, in the course of tests conducted.

"Material" characteristics

| | |
|---|---|
| -continued | |
| Nature | Carbon spring steel |
| Specific weight | 7,850 kg/m$^3$ |
| Hardness | 45–50 RHC (Rockwell C units) |
| | 45–520 VH (Vickers units) |
| Elastic modulus | 21 E4 N/mm$^2$ |
| Elastic limit | 1,500 N/mm$^2$ |
| Ultimate strength | 1,750 N/mm$^2$ |
| Elongation at fracture | 0,715% |
| Annealing process | isothermal bainitic |
| Surface treatment | zinc phosphate |
| Dimensions in the free state | |
| External diameter | |
| Stressing element | 133.5 (+1.6) mm |
| Supporting member | 145.0 (+1.6) mm |
| Thickness | 2.82 (−0.1) mm |
| Radial height | |
| Stressing element | 6.46 (+0.15) mm |
| Supporting member | 7.21 (+0.15) mm |
| Internal diameter | 138.0 (+1.6) mm |
| Opening | 7 mm |
| Outer edges | sharp |
| Inner edges | rounded |

In regard to the viscoelastic material 8, it can be supplied at the outset in the form of film or sheet or in the form of special resins or rubbers.

In the form of film or sheet, the material offers an advantage in that it is capable of covering a standard range of applications with but few references.

The desired optimum operating point (frequency of vibrations to be damped, utilization temperature) will be obtained by determining the most suitable thickness over an existing range which includes two or even three formulations (adapted to differentiated utilization temperatures).

Optimization of damping will be obtained when choosing the thickness of the stress layer.

In the case of special resins and rubbers, they offer the advantage of greater ease of manufacture of the device, in particular in regard to the resins.

The quantity employed is adjusted to requirements and there are no resultant losses of material.

These resins are usually epoxy resins (single or two-component resins) to which a specific filler has been added.

Polymerization can be carried out in the cold or hot state according to the performances required (temperature stability).

The tests carried out on the device involved the use of viscoelastic material having the following characteristics:

| "Material" characteristics | |
|---|---|
| Nature | Polyurethane |
| Specific weight | 1,100 kg/mm$^3$ |
| Hardness (Shore A) | 34 N/mm$^2$ |
| Elongation at fracture | 250% |
| Embrittlement temperature | −30° C. |
| optimum | 95° C. |
| maximum | 176° C. |
| Thickness | 0.25 mm |

Bonding of the three layers is performed with structural adhesives specially chosen for their mechanical characteristics (vibration resistance, high resistance to shear stresses, temperature stability) and their resistance to engine oils.

Bonding of the three layers has been carried out by means of a structural adhesive of the very-fast-setting cyanoacrylate type.

In regard to the tests which have been conducted, elementary analysis of the vibratory behavior of a standard toothed wheel (nominal diameter 170 mm) has been carried out before and then after utilization of the removable vibration-damping device.

The procedure adopted in order to characterize damping of this part consists in measuring the rate of decay of the level of vibration acceleration picked-up in proximity to the gear-teeth (axial direction), an excitation force being applied on the pinion beforehand by impact (hammer).

The frequency at which the rate of decay has been measured has been determined from a measurement of the spectral response of the wheel by means of a suitable device.

This measurement has shown evidence of marked resonance with slight damping at approximately 2,350 Hz. All the measurements were carried out at 20° C.

The results obtained are as follows:

Damping prior to treatment

The first marked resonance is at 2,350 Hz. This value is located in the ⅓ octave band which has a center frequency of 2,500 Hz; the measurements of decay have therefore been carried out with the ⅓ octave filter which is locked to this frequency. The time required for observing a 60 dB signal decay (ref. $10^{-5}$ m.s$^{-2}$) is 5.5 seconds.

Damping after treatment

Under the conditions mentioned earlier, the decay time of the response signal is less than 0.24 second, which corresponds to relative damping having a value higher than 22.

The results of the measurements confirm the excellent damping obtained with the device in accordance with the invention.

Figure 5:
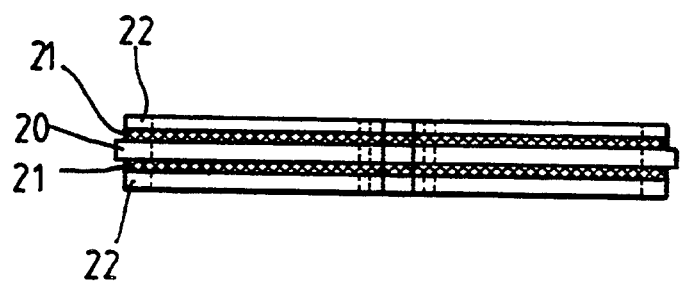
FIG. 5 is a vibration-damping device in accordance with another embodiment.

In an alternative embodiment shown in FIG. 5, the damping device is constituted by a supporting and coupling member 20, there being placed respectively on each side of member 20 a viscoelastic material 21 and a stressing element 22 which are assembled together in accordance with the techniques described earlier.

The advantages are as follows:

Broadening of the range of efficiency, in temperature or in frequency, by virtue of the spectral complementarity of the two configurations.

Enhanced efficiency at the temperature and frequency contemplated at the outset by doubling the "exchange" surface area of the standard model (two identical configurations on each side of the coupling layer). The stacks are not a priori limited in number.

Figure 6:
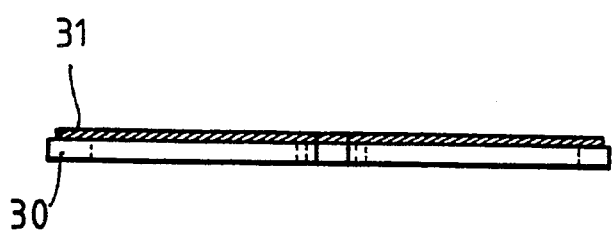
FIG. 6 is a vibration-damping device in accordance with another embodiment, of the unstressed type.

In another alternative embodiment which is illustrated in FIG. 6, the damping device is made up solely of a supporting and coupling member 30 on which is placed a viscoelastic material 31 but which does not support a stressing element in this instance.

Figure 7:
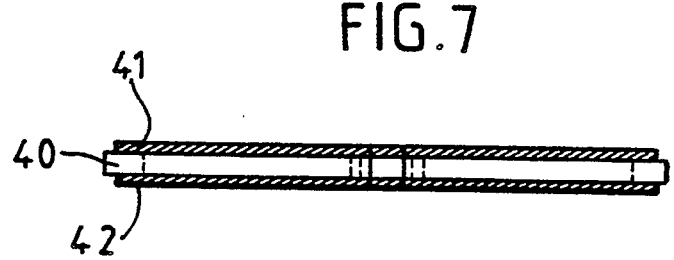
FIG. 7 is a vibration-damping device in accordance with another embodiment, of the unstressed type.

In a further alternative embodiment shown in FIG. 7, the damping device comprises a supporting and coupling member 40 which is interposed between layers 41 and 42 of viscoelastic material and does not support any stressing element.

The unstressed models just referred-to have lower efficiency than the stressed models but can nevertheless find an application in specific cases.

Finally, it is worthy of note that the supporting and coupling member and the stressing element can be formed from composite materials of the glass laminate type (fabrics) and impregnation resins (polyester, etc.) or any future material which would have suitable physical characteristics.

All viscoelastic materials which are available to date as well as existing methods of bonding (between the different layers) can be employed without setting any limit to the possibilities which may be contemplated.

Similarly, it is possible by way of alternative to position the stressing element at the time of assembly on the outside with respect to the vibration emitter, with the same advantages from the point of view of antivibration efficiency but there is an attendant danger of release of the stressing element in the event of detachment of the layers.

What is claimed is:

1. An emitter assembly comprising
an emitter rotatable about an axis, said emitter having an annular retaining groove concentric to said axis,
an elastically deformable first open ring which is seated in said retaining groove under radial stress,
a viscoelastic material bonded to said first open ring independently of said emitter, and
a stressing element in the form of a second open ring bonded to said viscoelastic material, said viscoelastic material being sandwiched between said stressing element and said first open ring, said stressing element being isolated from said emitter by said viscoelastic material.

2. An emitter assembly as in claim 1 wherein the open ring alone is in mechanical contact with the emitter.

3. An emitter assembly as in claim 1 wherein the open ring is formed of carbon spring steel.

4. An emitter assembly as in claim 1 wherein the stressing element is formed of carbon spring steel.

5. An emitter assembly as in claim 1 wherein the viscoelastic material is a polyurethane.

6. An emitter assembly as in claim 1 wherein the viscoelastic material is a filled epoxy resin polymerized in the hot or cold state.

7. An emitter assembly as in claim 1 wherein the open ring and the stressing element are bonded to the viscoelastic material by an adhesive.

8. An emitter assembly as in claim 1 wherein said emitter comprises a disk-like body, said stressing element facing said disk-like body.

* * * * *